United States Patent [19]

Stober et al.

[11] Patent Number: 4,940,785
[45] Date of Patent: Jul. 10, 1990

[54] METHOD OF PREPARING CELLULOSE ETHERS CONTAINING TERTIARY OR QUATERNARY NITROGEN

[75] Inventors: Reinhard Stober, Hasselroth; Dietmar Bischoff, Marktbreit; Michael Huss, Eschborn, all of Fed. Rep. of Germany

[73] Assignee: Degussa Aktiengesellschaft, Frankfurt, Fed. Rep. of Germany

[21] Appl. No.: 252,933

[22] Filed: Oct. 4, 1988

[30] Foreign Application Priority Data

Oct. 3, 1987 [DE] Fed. Rep. of Germany ....... 3733507

[51] Int. Cl.$^5$ .................... C08B 11/00; C08B 11/02; C08B 11/145; C08B 11/193
[52] U.S. Cl. ........................................ 536/90; 536/84; 536/85; 536/91; 536/95; 536/96; 536/97; 536/98
[58] Field of Search ................ 536/50, 56, 84, 85, 536/90, 91, 95, 96, 97, 98

[56] References Cited

U.S. PATENT DOCUMENTS 3,346,563 10/1967 Shildneck et al. ............... 536/50
4,281,109 7/1981 Jarowenko et al. ............... 536/50
4,332,935 6/1982 Fischer et al. ................... 536/50

FOREIGN PATENT DOCUMENTS 2063282 8/1978 United Kingdom ................ 536/50

*Primary Examiner*—John Kight, III
*Assistant Examiner*—Carlos Azpuru

[57] ABSTRACT

A method for preparing cellulose ethers containing tertiary or quaternary nitrogen by reacting alkylene epoxides with cellulose or its derivatives in an alkaline medium in the presence of water. Alkylene epoxides of the formulas

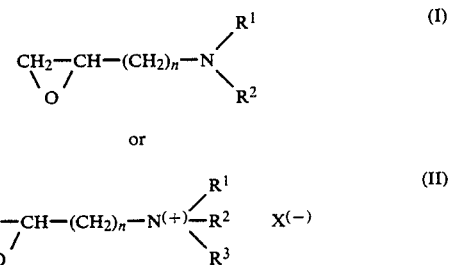

or mixtures thereof, in which n=1, 2 or 3, $R^1$, $R^2$ and $R^3$ correspond to the same or different alkyl groups with 1 to 18 carbon atoms or $R^1$ corresponds to the benzyl group or —$C_2H_4OH$ and X is chloride, bromide, sulfate or acetate are used as cationization agents.

12 Claims, No Drawings

METHOD OF PREPARING CELLULOSE ETHERS CONTAINING TERTIARY OR QUATERNARY NITROGEN

INTRODUCTION AND BACKGROUND

The present invention relates to a method for preparing cellulose ethers containing tertiary and quaternary nitrogen.

Cellulose ethers containing quaternary nitrogen are known from DE-OS No. 1 593 657 (U.S. Pat. No. 3,472,840) and are obtained according to the reaction conditions therein described by reacting cellulose with e.g. 2,3-epoxypropyl trimethyl ammonium chloride in organic solvents which can contain 0.2 to 5% water in relation to the cellulose.

Cationically modified cellulose derivatives are also described in JP-OS No. 53/90368 (CA 89 (22): 18 14 23 w). Here, a mixture of water, isopropyl alcohol and aqueous sodium hydroxide solution are used as the reaction medium.

The presence of an organic solvent which is largely inert under reaction conditions in relation to the etherification reagent is also especially advantageous according to De-OS No. 3 301 667. The cellulose is suspended in the organic solvent, the suspension thus formed is compounded with the aqueous solution of an alkali hydroxide and the etherification reagent subsequently added.

The reaction according to European Patent No. A-0189 935 also follows this pattern.

Water-soluble products are obtained in all the above specified instances which are separated after the neutralization, washed and dried.

The known methods entail the use of large amounts of organic solvent, small charge concentrations, low yields and also the loss of product due to its solubility in the reaction mixture.

The cellulose products modified in this manner are used in cosmetics (hair treatment), in textiles (softener, antistatic agents), in the paper industry, in flotation and flocculation and in drilling fluids. The uses of these cellulose products are well known in the art.

SUMMARY OF THE INVENTION

An object of the invention is to provide a simplified method for preparing cellulose ethers containing tertiary and quaternary nitrogen.

In achieving the above and other objects, the present invention provides a method for preparing cellulose ethers containing tertiary or quaternary nitrogen by reacting alkylene epoxides with celluloses or their derivatives in an alkaline medium in the presence of water which is characterized in that the reaction mixture is observed to be in a dry, powdery state and contains 10 to 25% by weight water, preferably 12 to 16% by wt., in relation to its total amount.

The reaction mixture is alkalized by the addition of 1 to 4% by wt. of an alkali metal or alkaline-earth metal hydroxide or oxide, or of an alkali silicate and/or alkali aluminate or of a mixture of alkali hydroxides or oxides or alkaline-earth hydroxides or oxides and alkali carbonates or of a mixture of one or more of these hydroxides, oxides or carbonates with an alkali silicate and/or alkali aluminate.

It is preferable to use 1.9 to 2.1% by wt. of an alkali hydroxide or 2.9 to 3.1% by wt. of the alkaline-earth hydroxide or oxide in relation to the amount of cellulose (dry substance) in each instance.

In this connection, alkali signifies especially the sodium cation and alkaline earth the calcium cation.

DETAILED DESCRIPTION OF THE INVENTION

According to the invention, the etherification of the cellulose or of its derivatives takes place with alkylene epoxides or mixtures of these epoxides of the general formula:

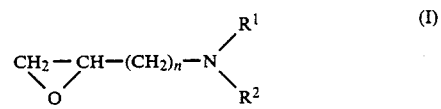

or preferably

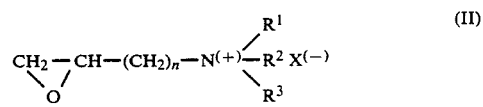

in which n is a number from 1 to 3, especially 1; $R^1$, $R^2$ and $R^3$ correspond to the same or different alkyl groups with 1 to 18 carbon atoms or $R^1$ can be benzyl or $C_2H_4OH$ and $X^{(-)}$ is chloride, bromide, sulfate or acetate, especially chloride. Alkyl groups with 1 to 4 carbon atoms are preferred.

Instead of the alkylene epoxides, the corresponding chlorohydrins can also be used for purposes of the invention, in which instance the reaction to form the epoxides corresponding to formulas (I) and (II), which react in turn with the cellulose or its derivatives, takes place at the latest in the reaction medium.

However, in this instance the stoichiometric amount of alkali for converting the chlorohydrins into the epoxides must be added in addition to the catalytic amount.

According to the invention, cellulose and the following derivatives are added:
 HEC (=hydroxyethyl cellulose);
 MHC (=methylhydroxyethyl cellulose);
 CMC (=carboxymethyl cellulose or its salts);
 Hydroxypropyl cellulose;
as well as celluloses which carry combinations of the various groups. These cellulosic substances are well known in the art and any suitable cellulosic substance of this type can be used for purposes of the invention.

A neutralization of the final product is frequently not necessary, depending on the application.

There is also the possibility of adding an organic acid (e.g. adipic acid) during the mixing process in order to obtain a neutral product.

In carrying out the invention, 0.005 to 1 mole epoxide according to formulas (I) or (II), preferably 0.05 to 0.6 mole epoxide, is added per hydroxyl group in the cellulose molecule or derivative molecule. This results in a degree of substitution (DS) of 0.005 to 1 or of 0.05 to 0.6 at a yield of 100%. In a preferred embodiment, the mixture of cellulose or its derivative, the substance with alkalizing action, the alkylene epoxide and water is homogenized in a high-efficiency intensive mixer for 10 seconds to 25 minutes, preferably 20 seconds to 5 minutes. Thereafter, the mixture is removed and the cationization reaction is allowed to proceed to an end.

Further mixing energies and additional processing steps are then no longer necessary.

The range of the reaction temperature for the process extends from 5° to 75° C., especially from 5° to 45° C.

If a more rapid reaction is desired, the mixer and the container in which the residual reaction takes place are heated to the temperatures indicated above up to 75° C.

It is also possible to heat only the mixer and to allow the residual reaction to proceed without further expenditure of heat at room temperature (20° to 25° C.) or vice versa; i.e. to heat the reaction mixture.

It is preferable if the work is performed at the temperature which develops in the mixer without an external supply of heat (18° to 30° C., preferably 20° to 25° C.). The reaction mixture, after homogenization, is immediately charged into a container provided for shipment or into a storage silo and the cationization reaction is allowed to proceed to its end at the temperature which then develops as a function of the ambient temperature or of the room temperature.

This temperature is approximately 18° to 30° C., especially approximately 20° to 25° C., as a function of variations dependent on ambient conditions, e.g. the season.

The brief residence time in the mixing unit also makes possible a continuous performance of the dry cationization in this manner.

Suitable high-efficiency intensive mixers are e.g. plowshare mixers, especially with one or several knife heads (continuous and discontinuous) and moistening flowmixers (continuous).

The sequence of the addition of reagent to the cellulose or cellulose derivative in a reaction vessel is not critical for success. In general, the following procedure is used: With the mixer running, the substance for producing the alkalizing action in aqueous solution or as an aqueous suspension or as a solid is added dropwise onto the cellulose or its derivative, or preferably is sprayed onto it within 10 seconds to 5 minutes. Then, the cationization agent is preferably sprayed on. Water can also be sprayed on at this point.

The reaction time indicated above for the homogenization begins when the epoxide is dosed in.

However, it is also possible to add all components at the same time to the cellulose or its derivatives.

The water content is adjusted in such a manner that the minimum amount of water necessary for the reaction is reached or exceeded at a level of 10% by weight. Naturally, this amount of water takes into consideration the amounts of water brought in by the epoxide solution.

In addition to these components, 0.01 to 2% by wt., preferably 0.1 to 1.0% by wt. of a finely divided silica are present in the reaction mixture in relation to its total amount. The silica can be precipitated silica or silica produced by flame hydrolysis. Either hydrophilic or hydrophobic type silica can be used.

The specific surface areas are between 60 and 700 m²/g, preferably 100 and 450 m²/g (BET measurement according to DIN No. 66 131, $N_2$ adsorption at the temperature of liquid nitrogen, previous heating of the specimen at 110° C.).

It is preferable to use to use hydrophilic, precipitated silica with a specific surface area of 190 to 450 m²/g, especially a spray-dried, precipitated silica with a specific surface area of 190 m²/g (BET measurement).

Mixtures of hydrophobic and hydrophilic silica can also be used.

Analysis

Approximately 20 g of the reaction samples are removed per analysis, dispersed in 200 g of an isopropanol/water or acetone/water mixture (4:1 in each instance), adjusted to pH 4 with 10% hydrochloric acid and filtered off. After two washings with 200 g isopropanol/water or acetone/water each time a vigorous removal by suction is performed and the filter cake dried at 75° C. for 4 hours in a vacuum drying cabinet. The degree of conversion is subsequently determined by a nitrogen determination according to Kjeldahl.

The yield can be indicated as the ratio of the nitrogen content found to the theoretical nitrogen content. Attention must be paid to the fact thereby that the non-cationized cellulose or its derivative may exhibit a basic nitrogen content which must be subtracted from the nitrogen content found.

$$\% \text{ yield} = \frac{(\% N_{fd.} - \% N_o)}{\% N_{th.}} \times 100$$

$\% N_{fd.}$ = nitrogen content found
$\% N_{th.}$ = theoretically calculated nitrogen content
$\% N_o$ = basic nitrogen content of the cellulose or its derivative $$\% N_{fd.} = \frac{V \times 0.14}{E}$$

V = consumption of HCl solution in the titration for nitrogen determination according to Kjeldahl (in ml)
E = weighed portion of the cationic cellulose or its derivative (dry) (in g)

$$\% N_{th.} = \frac{m_{Nt}}{M_{cat. \text{ cellulose}}} \times 100$$

$m_{Nt}$ = calculated mass nitrogen for a certain theor. DS.
$m_{cat.}$ cellulose = calculated mass of the reaction product for a certain theor. DS.

Another possibility is to indicate the yield as a ratio of the practical and the theoretical degree of substitution:

$$\% \text{ yield} = \frac{\text{practical } DS}{\text{theoretical } DS} \times 100$$

Calculation of the practical DS:

$$\text{pract. } DS = \frac{(\% N_{fd.} - \% N_o) \times M_c \text{ g/mole}}{(14 \text{ g/mole} \times 100) - (\% N_{fd.} - \% N_o) \times 151.64 \text{ g/mole}}$$

$M_c$ (g/mole) = molecular weight portion (monomer unit) of the cellulose or its derivative
151.64 g/mole = molecular weight of the cationization reagent (QUAB (R) (2,3-epoxypropyltrimethyl ammonium chloride)

$\% N \times 151.64$ g/mole = correction factor for the increase of the molecular mass of each substituted cellulose monomer unit %$N_o$ = basic nitrogen content of the cellulose or of its derivative Molar mass and cellulose or derivatives used for the calculation (relative molar masses of the monomer units):

| | |
|---|---|
| Cellulose type Elcema ® 100 pM = (Degussa AG) | 162.15 g/mole |
| HEC type QP 4400 M = (Union Carbide Corp.) | 206.2 g/mole* |
| MHC Tylose ® MH 2000 xp M = (Hoechst AG) | 220.23 g/mole* |
| Na—CMC Tylose ® C 1000 p M = Tylose ® CB 30 000 p | 245.19 g/mole* |

Exact values not possible since the DS of the derivatives is non-uniform. For this reason, these values were used as base for the calculation.

Calculation of the theoretical DS:

$$\text{theor. DS} = \frac{n_{QUAB}}{n_{cellulose}}$$

$n_{QUAB}$ = molar amount of cationization reagent QUAB added $n_{cellulose}$ = molar amount of dry cellulose or its derivative The results obtained according to both methods of calculation differ since the relation between degree of substitution and nitrogen content of the cationic cellulose or of its derivative is not linear.

Experimental section
General data:

The mixtures were immediately removed after the indicated mixing time and stored in tightly closed polyethylene bags at room temperature (20°–25° C.).

Unless otherwise indicated, the specimens were repeatedly washed with an isopropanol/water mixture (80:20 percent by weight), dried and analyzed.

I. Influence of the $H_2O$ and NaOH content 630 g HEC (4.6% moisture), 6.0 g spray-dried silica (190 m$^2$/g), 20.03 g NaOH ($\hat{=}$1%) or 40.07 g NaOH ($\hat{=}$2%) as 30% solution, 162.5 g QUAB (68% active content) as well as the amounts of $H_2O$ indicated in table 1 were added one after the other into a running 4 liter plowshare mixer with a knife head and intensively mixed for 10 minutes.

TABLE 1

| Test No. | $H_2O$ added | Total Moisture | % NaOH (dry HEC) | % N cation. | DS pract. | yield |
|---|---|---|---|---|---|---|
| Ia | 24.00 | 12 | 1 | 0.413 | 0.064 | 25.5 |
| Ib | 64.09 | 16 | 1 | 0.426 | 0.066 | 26.3 |
| Ic | 108.22 | 20 | 1 | 0.543 | 0.085 | 34.0 |
| Id | 10.76 | 12 | 2 | 1.145 | 0.193 | 77.0 |
| Ie | 51.20 | 16 | 2 | 1.157 | 0.195 | 77.9 |
| If | 95.69 | 20 | 2 | 1.162 | 0.196 | 78.3 |

The determination of yield took place after 4 days.
The theoretical degree of substitution (DS$_{th}$) amounts to 0.25.

II. Dependency yield ⟷ DS 700 g HEC (5% moisture), 44.33 g NaOH (30%) as well as the amounts of QUAB and $H_2O$ indicated in table 2 were added one after the other into a 4 liter plowshare mixer with a knife head and intensively mixed for 10 minutes.

After 5 days of storage at room temperature, the mixtures were analyzed and the results collated in table 2 were obtained:

TABLE 2

Catalyst amount: 1% NaOH, QUAB: active content 69.8%, 21% $H_2O$

| Test No. | DS theo. | QUAB (g) | $H_2O$ | Total Moisture | % N cation. | DS pract. | yield (%) |
|---|---|---|---|---|---|---|---|
| IIa | 0 | 21.02 | 42.93 | 14 | 0.171 | 0.026 | 85.5 |
| IIb | 0.07 | 49.04 | 40.97 | 14 | 0.375 | 0.058 | 82.2 |
| IIc | 0.15 | 105.10 | 37.06 | 14 | 0.763 | 0.123 | 81.7 |
| IId | 0.30 | 210.19 | 29.73 | 14 | 1.322 | 0.227 | 75.8 |
| IIe | 0.45 | 315.61 | 21.60 | 14 | 1.925 | 0.358 | 79.6 |
| IIf | 0.613 | 429.29 | 9.44 | 14 | 2.353 | 0.465 | 75.9 |

III. Ca(OH)$_2$ as catalyst 5.254 kg HEC (4.83% moisture), the amounts of Ca(OH)$_2$ indicated in table 3, 0.3 kg water and 2.267 kg QUAB (active content 73%) were added one after the other into a 50 liter plowshare mixer with a knife head and intensively mixed for 10 minutes. After 8 days of storage at room temperature, the following yields were achieved:

DS$_{th.}$ = 0.45, moisture content 13%

TABLE 3

| Test No. | % Ca(OH)$_2$ | % N cation. | DS pract. | yield |
|---|---|---|---|---|
| IIIa | 1 | 1.213 | 0.206 | 45.7 |
| IIIb | 2 | 1.314 | 0.226 | 50.1 |
| IIIc | 3 | 1.372 | 0.237 | 52.7 |
| IIId | 4 | 1.387 | 0.240 | 53.4 |

IV. Influence of the mixer type 22.6 kg HEC (4.6% moisture), 1.437 kg NaOH (30% by wt.), 0.22 kg spray-dried silica (190 m$^2$/g) were placed in a 300 l plowshare mixer with a knife head and intensively mixed for 5 minutes. Subsequently, 6.525 kg QUAB (72.9% active content) and 0.7 kg water were sprayed on and the mixture intensively mixed for another 10 minutes. After 4 days of storage at room temperature, the batch was neutralized with 2.0 kg HCl (20% by wt.). The following yield resulted:

TABLE 4

| Test No. | % Moisture | DS theor. | % N cation. | DS pract. | yield (%) |
|---|---|---|---|---|---|
| IVa | 13 | 0.30 | 1.360 | 0.235 | 78.3 |

V. Influence of the sequence of the addition of reagent 22.728 g HEC (4.6% moisture) were placed into a 300 l plowshare mixer with a knife head. Subsequently, 10.40 kg QUAB (69.0% active content), 0.7 kg $H_2O$ and 1.44 kg NaOH (30% by wt.) were added with the mixer running and the mixture intensively mixed for 10 minutes. After 3 days, the yield indicated in table 5 was achieved.

Test IIe serves as reference example for the inverse addition of reagent.

Catalyst amount: 2% NaOH, 14% total moisture

TABLE 5

| Test No. | DS theor. | % N cation. | DS pract. | yield (%) |
|---|---|---|---|---|
| Va | 0.45 | 1.934 | 0.360 | 80.10 |
| IIe | 0.45 | 1.925 | 0.358 | 79.6 |

VI. Reaction at elevated temperature 600 g HEC (4.6% moisture), 274.53 g QUAB (69% active content), 38.16 g NaOH (30%) and 22.63 g water were added one after the other into a running 4 liter plowshare mixer with a knife head and heating jacket and intensively mixed 2.5 hours at 70° C.

TABLE 6

| Test No. | DS theor. | % moisture | % N cation. | DS pract. | yield (%) | % NaOH |
|---|---|---|---|---|---|---|
| VIa | 0.45 | 13 | 1.769 | 0.322 | 71.6 | 2% |

VII. Neutralization with adipic acid 6000 g HEC (0.46% moisture), 274.53 g QUAB (69% active content), 38.16 g NaOH (30% by wt.) and 22.63 g H₂O were added into a running 4 l plowshare mixer with a knife head and intensively mixed. Subsequently, 23 g adipic acid (1.10 molar equivalent) were added for neutralization and mixed for 5 minutes. After 8 days storage at room temperature, the following yield was achieved:

TABLE 7

| Test No. | DS theor. | % moisture | % NaOH | N | DS pract. | yield (%) |
|---|---|---|---|---|---|---|
| VIIa | 0.45 | 13 | 2 | 1.899 | 0.352 | 78.2 |

VIII. Cationization of cellulose 300 g cellulose Elcema ® 100 p (4.3% moisture and 79.6 g QUAB (67.44% active content) were intensively mixed for 10 minutes with the reagents indicated in table 8 in a 4 liter plowshare mixer with a knife head.

After 2 days storage at room temperature, the indicated yields were achieved (table 8).

DS$_{theor.}$=0.20 total moisture: 13.2%
Active contents: NaOH: 20% by wt.
Ca(OH)₂: 96% by wt.

TABLE 8

| Test No. | NaOH (g) | Ca(OH)₂ (g) | H₂O (g) | % N cation | DS pract. | yield (%) | % catalyst |
|---|---|---|---|---|---|---|---|
| VIIIa | 30.6 | — | — | 1.19 | 0.158 | 79 | 2.1 |
| VIIIb | — | 3.36 | 23.96 | 0.692 | 0.087 | 43.5 | 1.2 |

IX. Cationization of methyl hydroxyethyl cellulose 600 g Tylose MH 200 xp (5.6% moisture) and 600 Tylose MHB 10 000 yp (8.3% moisture) were intensively mixed for 10 minutes with the reagents indicated in table 9 in a 4 liter plowshare mixer with a knife head. After 2 days storage at room temperature, the indicated yields were achieved.

QUAB concentration: 70.5% active content
Catalyst amount: 2% (absolutely dry) as 30% by wt. solution

TALBE 9

| Test No. | DS theor. | QUAB (g) | NaOH (g) | H₂O (g) | Total Moisture | % N cation. | DS pract. | Yield (%) | Cellulose Derivat. |
|---|---|---|---|---|---|---|---|---|---|
| IXa | 0.20 | 110.64 | 37.76 | 16.13 | 13 | 0.887 | 0.154 | 77.2 | MH 2000 xp |
| IXb | 0.20 | 109.0 | 37.2 | 6.98 | 13 | 0.761 | 0.130 | 65.2 | MHB 1000 yp |

Results of analysis after washing with acetone/H₂O (80:20)

X. Cationization of Na-carboxymethyl cellulose 600 g Tylose C 1000 p (8.3% moisture) and 700 g Tylose CB 30000 p (10.5% moisture) were intensively mixed for 10 minutes with the reagents indicated in table 10 in a 4 liter plowshare mixer with a knife head.

After 6 days storage at room temperature, the indicated yields were achieved.

DS$_{theor.}$=0.20 QUAB active content: 70.5% NaOH content: 2% added as 30% by wt. solution

TABLE 10

| Test No. | QUAB | NaOH | H₂O | Total Moisture | % N cation. | DS pract. | Yield | Cellulose Derivat. |
|---|---|---|---|---|---|---|---|---|
| Xa | 96.53 | 36.68 | 8.02 | 14% | 0.254 | 0.046 | 22.9 | C 1000 p |
| Xb | 109.92 | 41.77 | 33.52 | 18% | 0.233 | 0.042 | 20.9 | CB 30000 p |

Results of analysis after washing with acetone/H₂O (80:20).

Further variations and modifications of the foregoing will be apparent to those skilled in the art and are intended to be encompassed by the appended claims. German priority application No. P 37 33 507.3 is relied on and incorporated herein.

We claim:

1. A method of preparing cellulose ethers containing tertiary or quaternary nitrogen comprising reacting an alkylene epoxide with cellulose or derivatives of cellulose in an alkaline medium in the presence of water, wherein the reaction mixture contains 10 to 25% by wt. water in relation to its total amount, said reaction mixture appearing to be in a dry, powdery state.

2. The method according to claim 1 wherein the alkylene epoxide has the general formula:

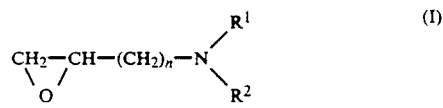

(I)

or

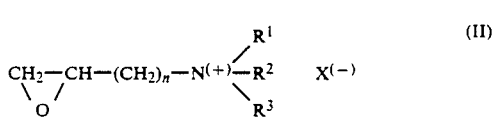

(II)

or mixtures thereof in which n=1, 2 or 3, R¹, R² and R³ correspond to the same or different alkyl groups with 1 to 18 carbon atoms or R¹ corresponds to the benzyl group or —C₂H₄OH and X is chloride, bromide, sulfate or acetate.

3. The method according to claim 1, wherein the reaction mixture of cellulose or derivative, alkaline medium, water and alkylene epoxide is homogenized in a high-efficiency mixer within 10 seconds to 25 minutes, then removed and allowed to react to completion.

4. The method according to claim 1, wherein the reaction mixture contains 0.01 to 2.0% by weight, in relation to the total amount, of a finely divided hydrophilic or hydrophobic silica, or mixture of silicas.

5. The method according to claim 3 wherein a plowshare mixer is used as high-efficiency mixer.

6. The method according to claim 3 wherein a moistening flowmixer is used as high-efficiency mixer.

7. The method according to claim 1 wherein the cellulose is hydroxyethyl cellulose, methyl hydroxyethyl cellulose, carboxy methyl cellulose or salt thereof, or hydroxy propyl cellulose.

8. The method according to claim 1 wherein the corresponding chlorohydrin of said alkylene epoxide is used.

9. The method according to claim 1 wherein the alkaline medium is an alkali metal or alkaline earth metal oxide or hydroxide, alkali silicate, alkali aluminate, alkali carbonate, or mixtures thereof.

10. The method according to claim 1 wherein an organic acid is added to the reaction mixture.

11. The method according to claim 1 wherein 0.005 to 1 mole of epoxide is present per hydroxy group of cellulose.

12. A dry, free flowing powdery product produced by the method of claim 1.

* * * * *